United States Patent [19]
Clay

[11] Patent Number: 6,000,447
[45] Date of Patent: Dec. 14, 1999

[54] SLIDING BANJO CAM LOCK FOR LATHE

[76] Inventor: Tymen Clay, 241 Monteith Avenue, Stratford, Ontario, Canada, N5A 2P6

[21] Appl. No.: 09/125,559
[22] PCT Filed: Feb. 21, 1997
[86] PCT No.: PCT/CA97/00119
  § 371 Date: Sep. 28, 1998
  § 102(e) Date: Sep. 28, 1998
[87] PCT Pub. No.: WO97/30831
  PCT Pub. Date: Aug. 28, 1997

[30]   Foreign Application Priority Data

Feb. 21, 1996  [CA]  Canada ................................. 2170006

[51] Int. Cl.⁶ ....................................................... B27C 7/06
[52] U.S. Cl. ................................ 142/49; 82/148; 82/160; 403/322.4; 403/374.5
[58] Field of Search ......................... 142/49, 50; 82/148, 82/158, 160, 164; 269/82, 204, 235; 248/429, 229.11, 229.21, 231.31; 403/322.1, 322.4, 374.5, 374.2; 409/241, 242

[56]          References Cited

U.S. PATENT DOCUMENTS

| | | |
|---|---|---|
| 706,673 | 8/1902 | Lorch . |
| 1,616,136 | 2/1927 | Moyer ....................................... 82/148 |
| 1,670,540 | 5/1928 | Humphreys ............................... 142/49 |
| 2,475,049 | 7/1949 | Premo . |
| 2,802,385 | 8/1957 | Schmidt .................................... 82/148 |
| 2,897,578 | 8/1959 | Strom . |
| 3,191,471 | 6/1965 | Stewart . |
| 3,602,077 | 8/1971 | Mitchell . |
| 4,184,718 | 1/1980 | Banach . |
| 4,569,262 | 2/1986 | Szush, Jr. . |

OTHER PUBLICATIONS

Cobra Woodlathe, Product Brochure entitled "The Right Choice" pp. 36 to 44, Undated.

General Mfg. Co. Ltd., Specifications and Product Brochure, 1990.

Primary Examiner—Steven C. Bishop
Attorney, Agent, or Firm—Young & Basile, P.C.

[57]           ABSTRACT

A mechanism for clamping a banjo (10) toolrest or toolrest bracket to a lathe bed (51) which makes use of a sliding cam (40) which is actuated by a drive shaft (18). The cam is supported independently of the drive shaft by a support block (12) resting on a ledge (14) wich is formed in the base of the banjo. The cam is slidable with respect to the drive shaft along the length of this ledge on the banjo. This structure allows for sturdy clamping with minimal deflection at a predicable catching position along the length of the banjo rest. An eye bolt (20) is used to connect the cam to a clamping plate (22) which is positioned below two, spaced-apart rails (50) extending along the top of the lathe bed. The banjo rest has a generally open bottom (94) through which the shank of the eye bolt extends. Opposite ends of the drive shaft are rotatably supported by end walls (74, 76) of the banjo rest.

20 Claims, 3 Drawing Sheets

SLIDING BANJO CAM LOCK FOR LATHE

FIELD OF THE INVENTION

This invention relates to slide rests suitable for lathes.

BACKGROUND OF THE INVENTION

Lathes are mechanical devices used in the art of carving wood pieces, generally into bowls and other shapes. Lathes are also used for some applications for the moulding of metals. The lathes operate by spinning wood pieces at high velocity while the operator carves the piece using a sharp instrument. The usual lathe has a flat horizontal bed with flat horizontal support rails mounted upon the lathe bed. Vertical support members cam connect the support rails to the lathe bed. A motorized unit for rotating the wood piece normally extends vertically above the lathe bed.

When carving a wood piece it is necessary for the lathe operator to make use of a fixed and stable support bar on which the carving instrument is supported while carving the wood piece. Without this support bar it would be impossible for the operator to have control over the carving instrument while working on the object of manufacture.

The support bar is the top member of a toolrest bracket referred to in the art as a banjo. A banjo consists of a horizontal support which is secured onto the support rails of a lathe bed by way of a clamping mechanism. A vertical portion of the banjo extends upwardly at one end. A top horizontal support bar which is rotatably disposed on the vertical portion of the banjo constitutes the actual toolrest.

Current mechanisms for clamping a banjo to support rails provide for poor or difficult clamping. These mechanisms typically consist of a bolt which extends through a slot where the bolt and the slot are both movable by the action of a handle which is attached to the bolt and is used to rotate the bolt. Two longitudinal clamps which are closed by the turning of the bolt are used to clamp the banjo to the support rails. A handle may be attached to the bolt either above or below the support rails. In either case, the positioning is awkward for the carpenter and the clamping effectiveness is often unsatisfactory.

Another design which is currently in use makes use of a cam in order to effect the clamping action necessary to clamp the banjo to the support rails. This design makes use of an elongate drive shaft which is supported in the banjo. The shaft has cams and support bearings at each end of the shaft. A lever is attached to the shaft to rotate the cams from an unclamped to a clamped position. In this case the rotation of the cams transfer upward movement to the shaft which is in turn transferred to an eye bolt which is moved vertically to pull up on a clamp plate which clamps to the support rails.

This design is problematic in that the drive shaft is subject to a downward pull during the clamping attempt due to the fact that the cams are located on the ends of the drive shaft. As such, when the clamping is to be effected towards the centre of the drive shaft, the drive shaft is prone to bend or deflect. As the drive shaft length is increased the degree of bending increases proportionally and leads to greater deflection.

SUMMARY OF THE INVENTION

The present invention solves these problems by removing the cams from the ends of the shaft and providing a cam which is supported independently of the drive shaft and which is mounted on the drive shaft such that the cam can slide on and with respect to the drive shaft. The drive shaft serves to rotate the cam between a clamping and a non-clamping position. An eye bolt is used as a cam receiver and the rotation of the cam causes an up or down motion of the eye bolt which pulls up and releases downwardly the clamp plate, thereby alternating the clamp plate between a clamped and an unclamped position. This assembly virtually nullifies deflection of the drive shaft at any clamping position. It is now possible to make larger banjos with longer drive shafts while preserving effective clamping. In addition, this mechanism allows the cam lever to stop at a consistent and predictable clamp position. This was generally not possible with the prior art. Finally, a much shorter cam throw is possible through zero deflection of the cam shaft.

According to one aspect of the invention, a tool supporting apparatus for use on a lathe comprises a tool supporting device including an elongate bracket having a bottom, said bottom having an elongate, longitudinally extending opening formed therein; an elongate drive shaft rotatably mounted in said bracket and extending longitudinally therein along said opening; a clamping mechanism slidably mounted in said bracket for clamping said tool supporting device rigidly to a bed of said lathe, said clamping mechanism including a rotatable cam member through which said drive shaft extends, a cam supporting member supported by said bracket, a clamping member, and a connector for connecting said clamping member to said cam member, said connector extending through said opening in the bracket, said cam member being rotatable with respect to said connector, whereby rotation of said cam member by said drive shaft causes said clamping member to move between a clamping position where said bracket is rigidly secured to said bed and an unclamped position, wherein said supporting member acts to support said cam member and thereby prevents movement of said drive shaft towards the bed of the lathe when the clamping member is brought to said clamping position.

According to a further aspect of the invention, a lathe apparatus comprises a lathe with a rigid lathe bed having an elongate opening formed therein; a tool supporting device including an elongate bracket having a bottom surface resting on said lathe bed and an elongate bottom opening extending longitudinally of said bracket; an elongate drive shaft rotatably mounted in said bracket and extending along and above said opening; and a clamping mechanism slidably mounted in or to said bracket for clamping said tool supporting device rigidly to said lathe bed, said clamping mechanism including a cam member slidably mounted on said drive shaft and rotatable thereby, a cam supporting member supported by said bracket, a clamping member disposed in or below said elongate opening in the lathe bed, and a connector for connecting said clamping member to said cam member, whereby rotation of said cam member to a clamping position by said drive shaft causes a portion of said lathe bed to be clamped between said clamping member and said cam supporting member, said cam member also being rotatable to a non-clamping position which permits the position of said tool supporting device to be changed relative to the lathe bed.

DETAILED DESCRIPTION OF THE ILLUSTRATED EMBODIMENT

Figure 1:
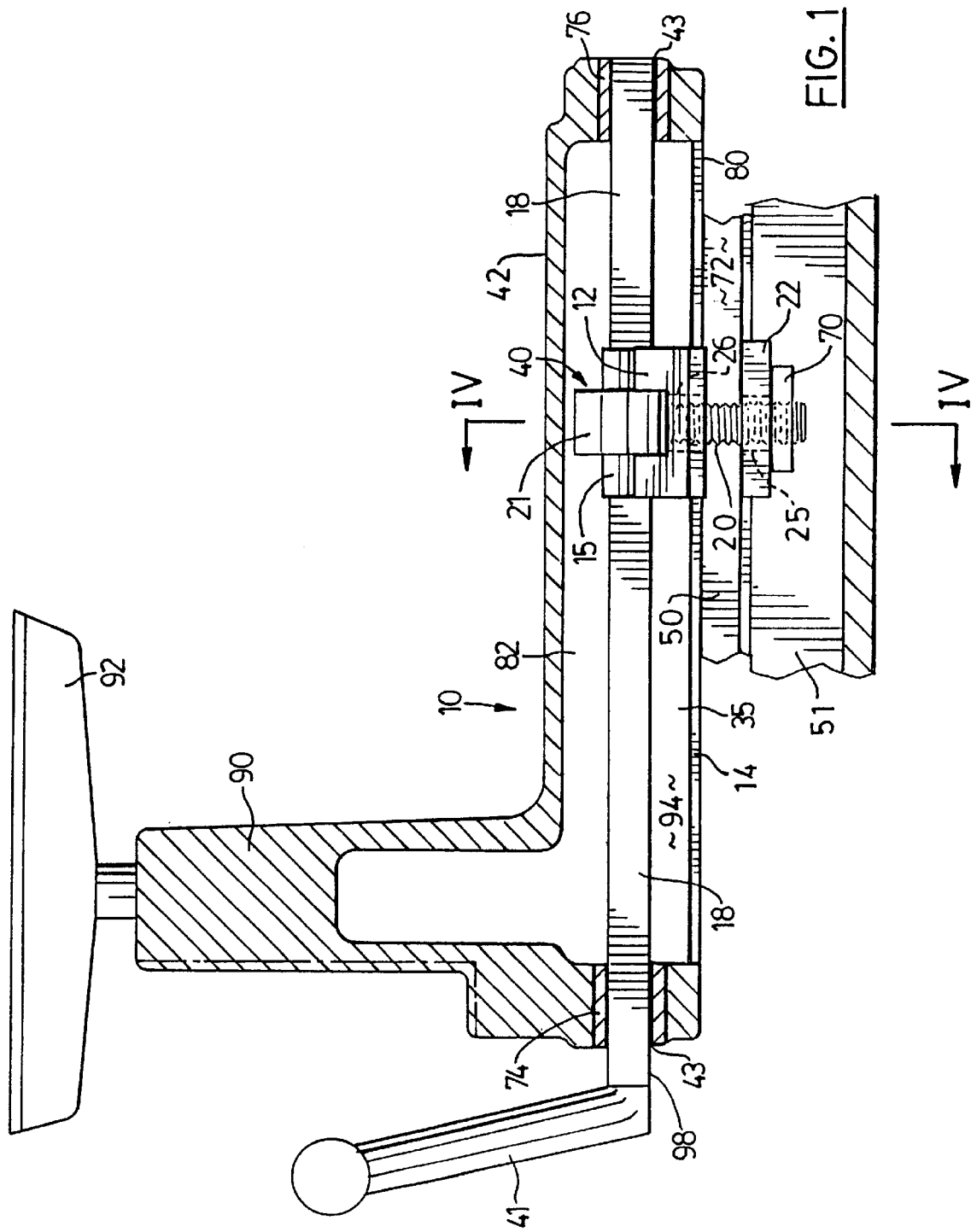
FIG. 1 is a cross-sectional view showing the clamping mechanism mounted in a toolrest bracket or banjo, this view taken along the lines I—I of FIG. 4.
Figure 2:
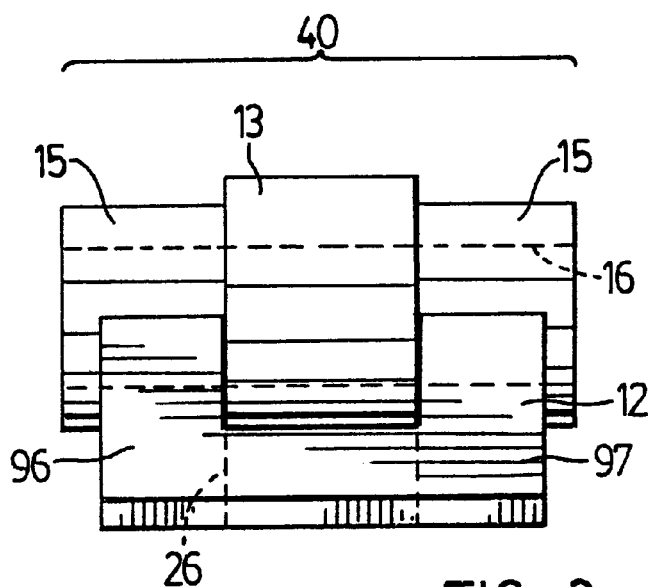
FIG. 2 is a side view of a cam and support block therefor used in the toolrest bracket of the invention.

FIGS. 1 to 4 show a clamping mechanism for locking a banjo 10 to the support rail or rails of a lathe bed. The banjo 10 is a tool supporting apparatus or tool supporting device. It is an elongate bracket made of a metal such as steel or iron and should be as rigid as possible.

A cylindrical cam 13 is attached to and supported by two bearing portions or members 15. The cam 13 and the coaxial bearing portions or members 15 form a continuous hollow cam shaft 40 having a passageway 16 of uniform transverse dimensions. These dimensions are those of a square in the preferred embodiment illustrated. The center axis of the cam 13 is offset from and parallel to the axis of the bearing portions. A support block 12 has two semi-cylindrical concave support surfaces 17 which support the bearing portions 15 of the cam shaft 40. The bearing members can easily rotate on the surfaces 17. The support surfaces 17 are formed in the top of two cam supporting end sections 96 and 97 of the support block 12.

An eye bolt has a head portion 21 connected to a threaded shank portion 20. The head portion 21 seats around the cam 13 while the shank portion of the eye bolt extends through a vertically extending opening or hole 26 which is situated in the center of the support member 12 between the two support surfaces 17. The shank portion extends through an elongate, longitudinally extending opening or slot, located at 94, formed in the bottom of the banjo. The shank portion 20 of the eye bolt is connected to a clamping member or plate 22 and extends through a bore 25 in the clamping plate 22. The shank portion 20 is threaded into a suitable clamp nut 70 which holds the plate 22 from below.

The eye bolt constitutes a connector for connecting the cam 13 to the clamping plate 22. The camming mechanism includes the cam shaft comprised of the bearing members 15 and cam 13, support block 12 and the eye bolt. The cam 13 is eccentric with respect to its integral bearing members 15 and has a larger diameter than the bearing members. As a result, when the cam shaft is rotated the cam moves up and down in relation to the bearing members and in relation to the support block. The up and down movement of the center of the cam is transferred to the eye bolt, causing a generally linear motion in the eye bolt. This motion of the eye bolt causes a corresponding motion of the clamping plate 22. When the cam is rotated away from its bottom dead center position, the clamping plate will move to the clamped position where it is clamped to a bottom of the support rail or rails 50. When the cam is at its bottom dead center position, the clamping plate will be in an unclamped position with respect to the lathe bed and the banjo will be free to move longitudinally along an elongate opening 72 formed between the rails 50.

Figure 3:
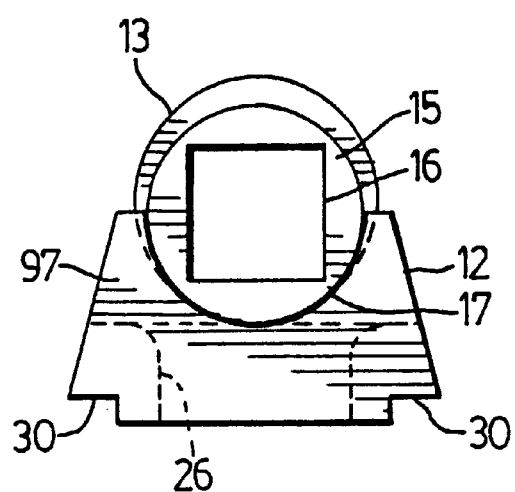
FIG. 3 is a right side view of the cam and support block of FIG. 2.

FIG. 3 clearly shows the passageway 16 in the interior of the cam shaft having the cam portion 13 at its center. It can be seen that the passageway 16 is square shaped in the illustrated embodiment. This passageway can have different non-circular shapes provided that the drive shaft is complementary in shape. The support member 12 has a flat support surface 30 formed along each side of the base of the support member. The two support surfaces 30 allow the support member to rest on two elongate support ledges 14 formed on the base of the banjo.

Figure 4:
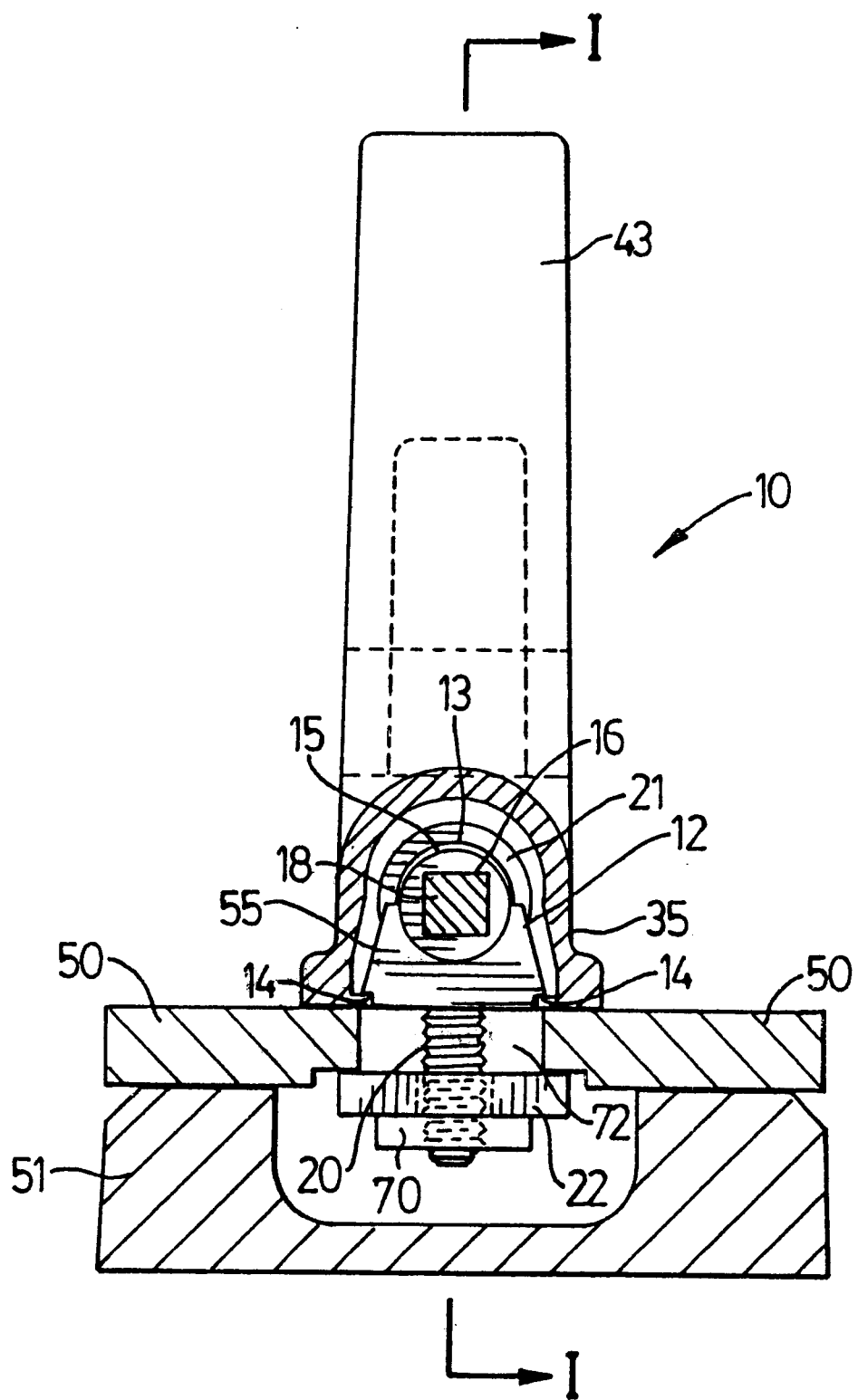
FIG. 4 is a cross sectional view taken along line IV—IV of FIG. 1.

As shown in FIGS. 1 and 4, drive shaft 18 fits through the passageway 16 formed in the interior of the cam shaft 40. When the elongate drive shaft 18 is rotated by pulling manually on a lever or handle 41, which is attached to a projecting end portion 98 of the drive shaft 18, the rotation of the drive shaft rotates cam shaft 40 and therefore cam 13. The resultant rotation of cam 13 actuates the linear motion of the eye bolt causing the clamping plate 22 to move either up or down as described above. The body of the banjo 42 rotatably supports the drive shaft 18 in circular holes formed at opposite ends of the banjo.

It will be understood the square shaft 18 has a round bushing mounted at each end, these bushings being indicated at 74 and 76. The shaft extends along and above the opening 94 in the bottom of the banjo. It will be understood that a drive shaft with a circular cross-section can also be used. In this case the drive shaft can be splined in the region of cam shaft travel over the length of the drive shaft to prevent the cam shaft from rotating relative to the drive shaft.

The banjo has a base 35 with a bottom or bottom surface at 80. Each ledge 14 is machined onto or otherwise formed on each side of the base 35 so that the support block 12 is supported by the base. It is important to note that the block 12 is supported not by the drive shaft 18 but by the ledges 14 located on the base 35. The cam shaft 40 is mounted such that it may slide on the drive shaft 18 while the support block 12 is free to slide with the cam shaft along the ledges 14. As such the entire clamping mechanism is free to slide in the banjo. The preferred banjo is hollow and forms a longitudinally extending passageway 82 in which the clamping mechanism can slide.

FIG. 4 illustrates the support block 12 resting on ledges 14 formed on the base of 35 of the banjo. The banjo 10 is shown resting on support rails 50 of lathe bed 51, only part of which is shown. It will be understood that the lathe itself, apart from the banjo 10, and the lathe bed can be of standard design and construction. Because the elongate support rails 50 are located at a position between the base of the banjo 35 and the clamping plate 22, when the clamping plate is at its upmost position the banjo 10 is effectively clamped to the support rails 50. When in the clamped position, the banjo 10 is secured tightly to the support rails 50 such that one can apply pressure to a tool bar or toolrest 92 attached to the vertical portion 90 of the banjo without the banjo slipping. Also because the support block 12 acts to support the cam shaft 40, it thereby prevents any significant movement or deflection of the drive shaft towards the bed of the lathe when the clamping plate is brought to the clamping position.

As will be apparent to those skilled in the art in the light of the foregoing disclosure, alterations and modifications are possible in the practice of this invention without departing from the spirit or scope thereof. Accordingly, the scope of the invention is to be construed in accordance with the substance defined by the following claims.

I claim:

1. A tool supporting apparatus for use on a lathe, said apparatus comprising:

a tool supporting device including an elongate bracket having a bottom, said bottom having an elongate, longitudinally extending opening formed therein;

an elongate drive shaft rotatably mounted in said bracket and extending longitudinally therein along said opening; and a clamping mechanism slidably mounted in said bracket for clamping said tool supporting device rigidly to a bed of said lathe, said clamping mechanism including a rotatable cam member through which said drive shaft extends, a cam supporting member supported by said bracket, a clamping member, and a connector for connecting said clamping member to said cam member, said connector extending through said opening in the bracket, said cam member being rotatable with respect to said connector, whereby rotation of said cam member by said drive shaft causes said clamping member to move between a clamping position where said bracket is rigidly secured to said bed and an unclamped position, wherein said supporting member acts to support said cam member and thereby helps to prevent movement of said drive shaft towards the bed of the lathe when the clamping member is brought to said clamping position.

2. A tool supporting apparatus according to claim 1 wherein said cam supporting member is a support block having two flat support surfaces formed on opposite sides thereof and said bracket is formed with two elongate support ledges located on opposite sides of the elongate opening in said bracket, said ledges engaging said support surfaces and acting to support said support block.

3. A tool supporting apparatus according to claim 1 wherein said elongate bracket has two opposite ends, said drive shaft is rotatably mounted in holes formed in said opposite ends, and an elongate passageway extends between said opposite ends, said clamping mechanism being slidable along said passageway.

4. A tool supporting apparatus according to claim 1 wherein said connector comprises an eye bolt having a threaded shaft portion and a threaded nut member attached to said shaft portion and holding said clamping member, said shaft portion extending through a hole in said clamping member.

5. A tool supporting apparatus according to claim 1 wherein said drive shaft has an end portion projecting from one end of said bracket and a lever is attached to said end portion to provide manual means for rotating said drive shaft.

6. A tool supporting apparatus according to claim 1 wherein said cam member includes a cylindrical, central cam portion and two cylindrical coaxial bearing portions located on opposite sides of said cam portion, a center axis of said cam portion being offset from and parallel to the axis of said bearing portions, wherein said bearing portions engage two concave support surfaces formed on said cam supporting member.

7. A tool supporting apparatus according to claim 2 wherein said support block has a vertically extending central hole formed therein and two cam supporting end sections located on opposite sides of said central hole and wherein said connector comprises an eye bolt with a threaded shaft that extends through said central hole, through said opening in the bracket, and through a hole in said clamping member.

8. A tool supporting apparatus according to claim 7 wherein said cam member comprises a cylindrical, central cam portion and two cylindrical coaxial bearing portions located on opposite sides of said cam portion, a center axis of said cam portion being offset from and parallel to the axis of said bearing portions, and wherein said bearing portions engage curved support surfaces formed on said cam supporting end sections and the cam member is supported thereby when said clamping member is moved to the clamping position.

9. A tool supporting apparatus according to claim 1 wherein said drive shaft has a non-circular, uniform cross-section along a substantial portion of its length and said cam member has a shaft-receiving passageway formed therein, this passageway having a matching, non-circular cross-section, and wherein said clamping mechanism is slidable along said substantial portion of the shaft.

10. A tool supporting apparatus according to claim 1 wherein said clamping member is a flat metal plate having a hole therein and said connector includes an eye bolt with a threaded shaft portion that extends through said hole in the metal plate.

11. A lathe apparatus comprising:

a lathe with a rigid lathe bed having an elongate opening formed therein;

a tool supporting device including an elongate bracket having a bottom surface resting on said lathe bed and an elongate bottom opening extending longitudinally of said bracket;

an elongate drive shaft rotatably mounted in said bracket and extending along and above said bottom opening; and a clamping mechanism slidably mounted in or to said bracket for clamping said tool supporting device rigidly to said lathe bed, said clamping mechanism including a cam member slidably mounted on said drive shaft and rotatable thereby, a cam supporting member supported by said bracket, a clamping member disposed in or below said elongate opening in the lathe bed, and a connector for connecting said clamping member to said cam member, whereby rotation of said cam member to a clamping position by said drive shaft causes a portion of said lathe bed to be clamped between said clamping member and said cam supporting member, said cam member also being rotatable to a non-clamping position which permits the position of said tool supporting device to be changed relative to the lathe bed.

12. A lathe apparatus according to claim 11 wherein said connector comprises an eye bolt having a threaded shaft portion and a threaded nut member attached to said shaft portion and holding said clamping member, said shaft portion extending through a hole in said clamping member.

13. A lathe apparatus according to claim 11 wherein said lathe bed includes two flat topped, spaced apart support rails with said elongate opening in the bed being formed between said rails and wherein, in said clamping position, said clamping member presses against bottom surfaces of said support rails.

14. A lathe apparatus according to claim 11 wherein said cam supporting member is a support block having two flat support surfaces formed on opposite sides thereof and said bracket is formed with two elongate support ledges located on opposite sides of the elongate bottom opening in said bracket, said ledges engaging said support surfaces and acting to support said support block.

15. A lathe apparatus according to claim 11 wherein said elongate bracket has two opposite ends, said drive shaft is rotatably mounted in holes formed in said opposite ends, and an elongate passageway extends between said opposite ends, said clamping mechanism being slidable along said passageway.

16. A tool supporting apparatus for use on a lathe having a lathe bed, comprising:

a rounded cam shaft having a passageway formed therein of uniform dimension, said passageway extending through the entire length of said cam shaft, said cam shaft having two rounded end pieces forming bearing members at each end thereof, said shaft also having a cam located between the bearing members eccentric to the bearing members;

a support block having two end sections, each end section forming a concave support surface which supports one of said bearing members of said cam shaft, said support block having a central opening between said end sections;

an eye bolt member having a generally circular head and a threaded shank, wherein the head extends around said cam and wherein said shank extends through said opening of the support block;

a drive shaft extending through said passageway in said cam shaft, said cam shaft being slidably disposed on said drive shaft;

an elongate support bracket having two opposite ends rotatably supporting said drive shaft, said bracket having at least one ledge formed thereon which supports said support block, said support block being slidably disposed on said at least one ledge; and a clamping plate which is connected to said shank of said eye bolt member wherein during use of said apparatus, said clamping plate can be pulled by the rotation of the cam to a clamping position where the clamping plate is in clamping contact with said lathe bed.

17. A tool supporting apparatus according to claim 16 wherein the support bracket is slidable with respect to the lathe bed when said clamping plate is in an unclamped position and said support bracket has a toolrest mounted thereon.

18. A tool supporting apparatus according to claim 16 wherein a handle is attached to one end of said drive shaft for imparting a rotational motion to the drive shaft.

19. A tool supporting apparatus according to claim 16 wherein said support bracket has a bottom with an elongate opening formed therein and two ledges are formed along opposite sides of said elongate opening, each ledge supporting one side of said support block.

20. A tool supporting apparatus according to claim 16 wherein said support bracket is hollow and forms an elongate, open-bottom passageway extending between said opposite ends, and said cam shaft, support block, and eye bolt member are slidable along said passageway.

* * * * *